(12) United States Patent
Ohno

(10) Patent No.: US 9,838,324 B2
(45) Date of Patent: Dec. 5, 2017

(54) INFORMATION PROCESSING SYSTEM, INFORMATION MANAGEMENT APPARATUS, AND DATA TRANSFER CONTROL METHOD

(71) Applicant: FUJITSU LIMITED, Kawasaki-shi, Kanagawa (JP)

(72) Inventor: Toshio Ohno, Nissin (JP)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 14/736,359

(22) Filed: Jun. 11, 2015

(65) Prior Publication Data

US 2016/0087906 A1   Mar. 24, 2016

(30) Foreign Application Priority Data

Sep. 22, 2014 (JP) .................................. 2014-192397

(51) Int. Cl.
*G06F 15/173* (2006.01)
*H04L 12/825* (2013.01)
*H04L 12/851* (2013.01)

(52) U.S. Cl.
CPC ............ *H04L 47/263* (2013.01); *H04L 47/24* (2013.01)

(58) Field of Classification Search
CPC ....... H04W 4/14; H04W 40/02; H04W 92/02; G06Q 10/06; H04M 3/367; H04M 15/8016
See application file for complete search history.

(56) References Cited

U.S. PATENT DOCUMENTS

| 4,777,595 A | * | 10/1988 | Strecker | G06F 15/177 370/474 |
| 7,313,105 B1 | * | 12/2007 | Lo | H04L 12/413 370/229 |
| 9,037,652 B2 | * | 5/2015 | Nojima | G05B 19/41855 709/205 |
| 2004/0208158 A1 | * | 10/2004 | Fellman | H04L 12/6418 370/345 |
| 2006/0187840 A1 | * | 8/2006 | Cuffaro | H04W 48/06 370/235 |

FOREIGN PATENT DOCUMENTS

| JP | 8-204732 | 8/1996 |
| JP | 10-98605 | 4/1998 |

* cited by examiner

*Primary Examiner* — Peling Shaw
(74) *Attorney, Agent, or Firm* — Fujitsu Patent Center

(57) ABSTRACT

An information processing system includes: a management apparatus coupled to nodes to execute data transfer, wherein the management apparatus preforms operations to: acquire data transfer information in which a priority level of data transfer and an identifier of a node that executes the data transfer are associated with an identifier of the data transfer; identify, when receiving an execution instruction of first data transfer, one or more first nodes that execute second data transfer having a lower priority level than a priority level included in information of the first data transfer based on the data transfer information; and transmit, to each of the one or more first nodes, a stop request to stop the second data transfer, and a transfer request including the information of the first data transfer and information of a portion to be executed by the first node of the first data transfer by the first node.

17 Claims, 15 Drawing Sheets

FIG. 6

```
// STRUCTURE
typedef struct exftrans_ctl {
    char srcpath[MAXPATHNAME+1];
    char dstpath[MAXPATHNAME+1];
    int64_t priority;
    agentlist_t *agentftrans_data;
} exftransctl_t;
```
⎫
⎬ 6001
⎭

```
typedef struct agentlist {
    char agentID[AGENTNAME+1];
    exftransreq_t *filetransreq;
    exftransrlt_t *filetransresult;
    agentlist_t *next;
} agentlist_t;
```
⎫
⎬ 6002
⎭

```
typedef struct exftransreq {
    offset_t start_offset;
    size_t  transdata_size;
} exftransreq_t;
```
⎫
⎬ 6003
⎭

```
typedef struct exftransrlt {
    offset_t start_offset;
    size_t  transdata_size;
} exftransrlt _t;
```
⎫
⎬ 6004
⎭

FIG. 8

```
// STRUCTURE (IO NODE SIDE)
typedef struct exftransreq {
    char srcpath[MAXPATHNAME+1];
    char dstpath[MAXPATHNAME+1];
    int fd;
    int64_t priority;
    size_t iolength;
    exftransreq_t *filetransreq;
    exftransrlt_t *filetransresult;
}
```

FIG. 9

```
// STRUCTURE
typedef struct exftrans_com {
    char srcpath[MAXPATHNAME+1];
    char dstpath[MAXPATHNAME+1];
    int64_t priority;
    int64_t ndata;
    union comm_data {
        exftransreq_t filetransreq[];
        exftransrlt_t filetransreq[];
    } comdata;
} exftrans_com _t;
```

INFORMATION PROCESSING SYSTEM, INFORMATION MANAGEMENT APPARATUS, AND DATA TRANSFER CONTROL METHOD

CROSS-REFERENCE TO RELATED APPLICATION

This application is based upon and claims the benefit of priority of the prior Japanese Patent Application No. 2014-192397, filed on Sep. 22, 2014, the entire contents of which are incorporated herein by reference.

FIELD

The embodiment discussed herein is related to an information processing system, an information management apparatus, and a data transfer control method.

BACKGROUND

When data is transferred, the order of transfer is changed in accordance with priority levels of transfer.

Related art is disclosed in Japanese Laid-open Patent Publication No. 10-98605 or Japanese Laid-open Patent Publication No. 8-204732.

SUMMARY

According to an aspect of the embodiments, an information processing system includes: a management apparatus, coupled to a plurality of nodes configured to execute data transfer, configured to manage the plurality of nodes, wherein the management apparatus preforms operations to: acquire data transfer information in which a priority level of data transfer and an identifier of a node that executes the data transfer are associated with an identifier of the data transfer; identify, when receiving an execution instruction of first data transfer, one or more first nodes that execute second data transfer having a lower priority level than a priority level included in information of the first data transfer based on the data transfer information; and transmit, to each of the one or more first nodes, a stop request to stop the second data transfer, and a transfer request including the information of the first data transfer and information of a portion to be executed by the first node of the first data transfer to be executed by the first node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a structure;
FIG. 8 illustrates an example of a structure;
FIG. 9 illustrates an example of a structure.

DESCRIPTION OF EMBODIMENT

For example, data transfer being executed is interrupted, and data transfer having a higher priority level than a priority level of the data transfer being executed is preferentially executed.

For example, a single apparatus may execute the above-mentioned data transfer.

For example, in a distributed file system, file transfer is executed by a plurality of nodes included in the distributed file system in a distributed manner. For example, in the case where the plurality of nodes transfer one file, each of the plurality of nodes transfers a part of the file, and the one file is thereby transferred as a whole.

Figure 1:
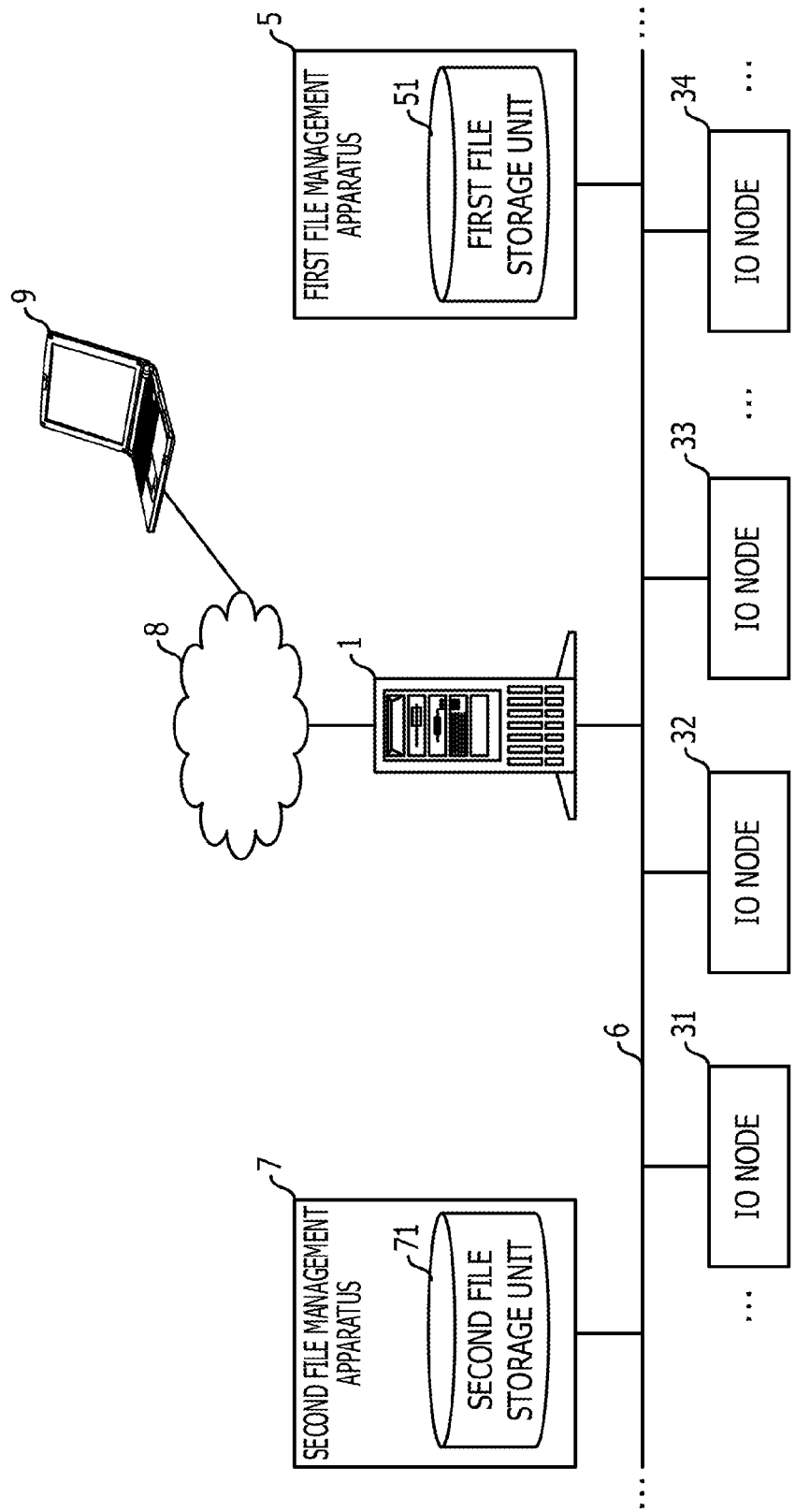
FIG. 1 illustrates an example of a system.

FIG. 1 illustrates an example of a system. In FIG. 1, a distributed file system is illustrated. A front-end server 1 is coupled to, for example, input/output (IO) nodes 31 to 34 that execute file copying, a first file management apparatus 5 that includes a first file storage unit 51, and a second file management apparatus 7 that includes a second file storage unit 71 via a network 6, such as a local area network (LAN). The front-end server 1 is coupled to, for example, a network 8, which is the Internet, and a user terminal 9 is coupled to the network 8. In FIG. 1, although the number of IO nodes is four, the number may be any number.

The user terminal 9 transmits an execution instruction containing information of file copying to be executed to the front-end server 1. When the front-end server 1 receives the execution instruction from the user terminal 9, the front-end server 1 assigns IO nodes to the file copying specified in the execution instruction. The IO nodes 31 to 34 execute the file copying in accordance with assignments made by the front-end server 1.

Figure 2:
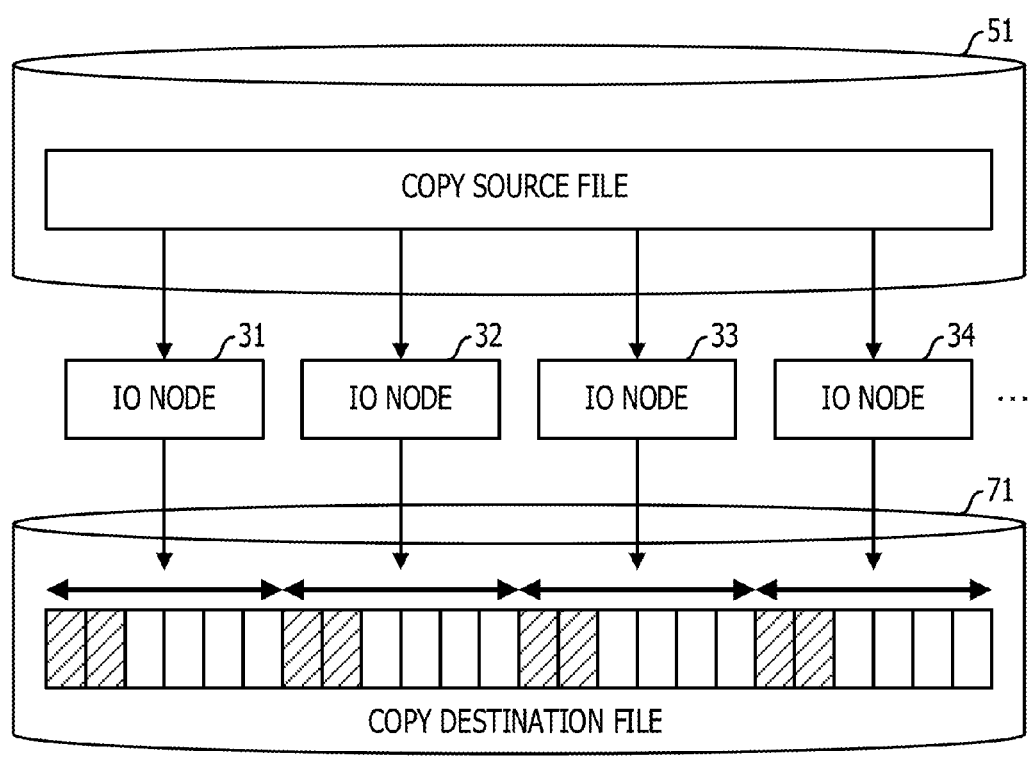
FIG. 2 illustrates an example of file copying.

FIG. 2 illustrates an example of file copying. In FIG. 2, file copying executed by the IO nodes 31 to 34 is illustrated. The IO nodes 31 to 34 copy a copy source file stored in the first file storage unit 51 to the second file storage unit 71. The size of data copied by each IO node may be substantially the same as the size of data copied by another IO node. A copy destination file is divided into 24 blocks, and each IO node copies data of one block in one copying operation. Shaded portions in the copy destination file denote portions in which copying has been completed. When one copying operation is completed, each IO node checks whether or not it has received a stop request to stop file copying from the front-end server 1.

Figure 3:
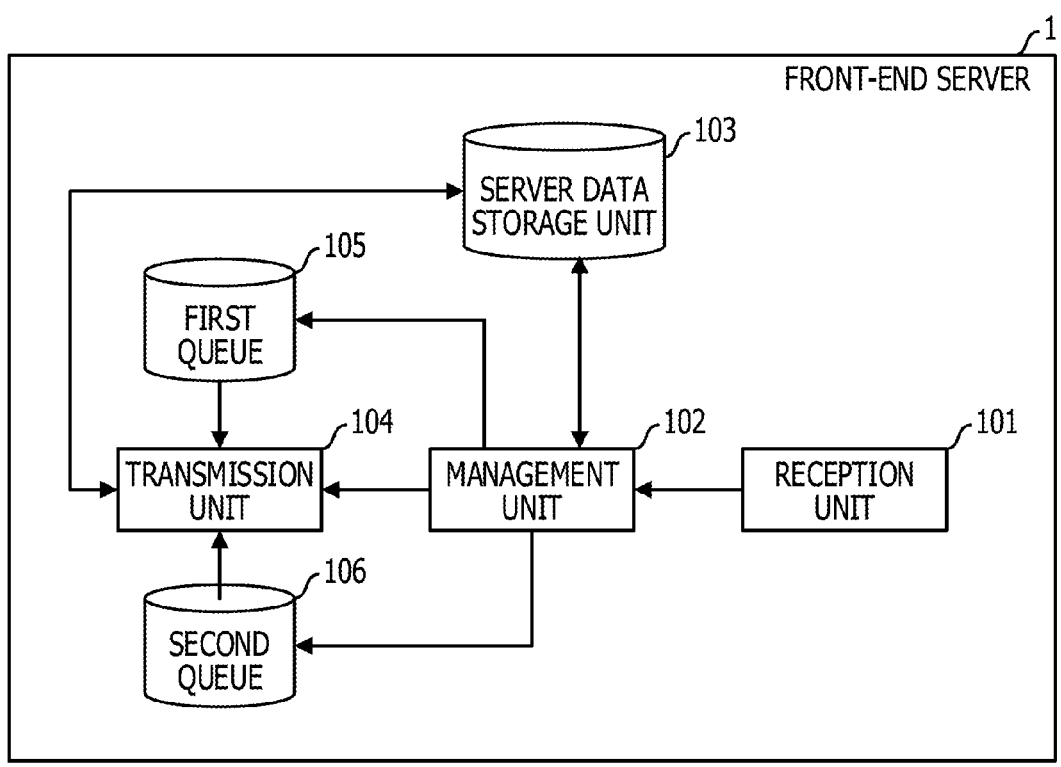
FIG. 3 illustrates an example of a functional block of a front-end server.

FIG. 3 illustrates an example of a functional block of a front-end server. The front-end server 1 includes a reception unit 101, a management unit 102, a server data storage unit 103, a transmission unit 104, a first queue 105, and a second queue 106.

The reception unit 101 receives an execution instruction of file copying from the user terminal 9, and outputs it to the management unit 102.

The management unit 102 executes processing based on the execution instruction received from the reception unit 101, and, in accordance with a processing result, stores a copying request in the first queue 105 or outputs a copying request to the transmission unit 104. The management unit 102 generates copying requests based on information contained in progress data received from the IO nodes 31 to 34, and stores the generated copying requests in the second queue 106.

The transmission unit 104 transmits the copying request received from the management unit 102 to an IO node that deals with the copying request. The transmission unit 104 transmits the copying request stored in the first queue 105 and the copying requests stored in the second queue 106 to IO nodes that deals with the respective copying requests.

Figure 4:
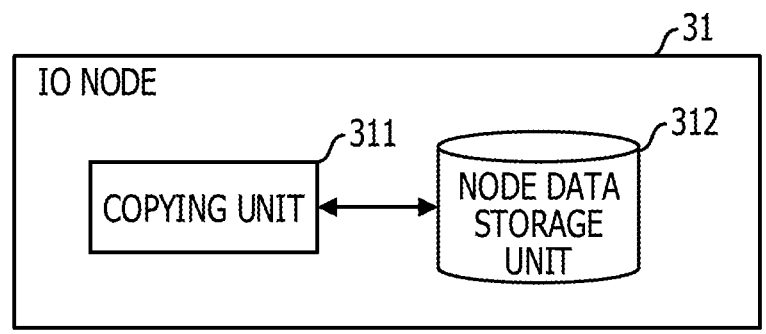
FIG. 4 illustrates an example of a functional block of an IO node.

FIG. 4 illustrates an example of a functional block of an IO node. The IO node 31 includes a copying unit 311 and a node data storage unit 312. The copying unit 311 executes file copying based on data received from the front-end server 1, and stores performance information representing a performance result of the file copying in the node data storage unit 312. Functional blocks of the IO nodes 32 to 34 may be substantially the same as or similar to the functional blocks of the IO node 31.

Figure 5:
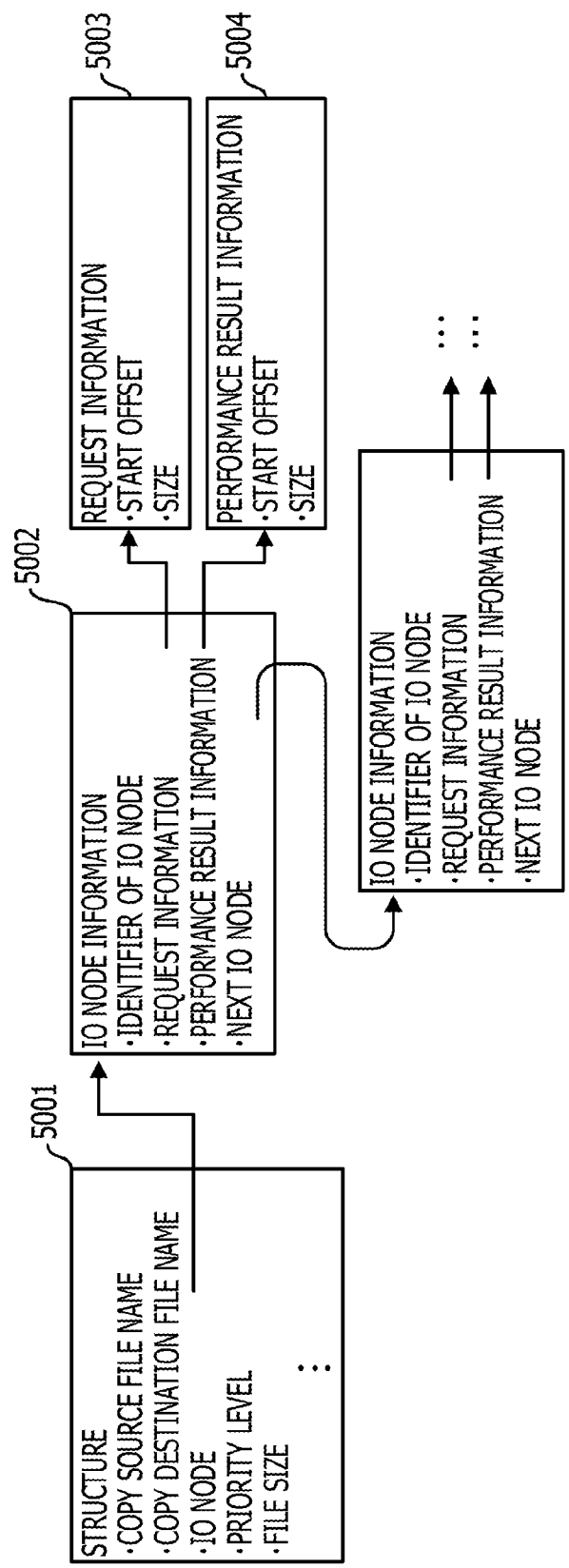
FIG. 5 illustrates an example of a data structure.

FIG. 5 illustrates an example of a data structure. In FIG. 5, the structure of data stored in the server data storage unit 103 illustrated in FIG. 3 is illustrated. Data is stored in the server data storage unit 103 as a structure. The structure may be generated for each execution instruction, and contains a copy source file name, a copy destination file name, data indicating IO node information, such as a pointer, a priority level, and a file size. The IO node information contains an identifier of an IO node, such as an IP address, data indicating request information, such as a pointer, data indicating performance result information, such as a pointer, and data indicating a next IO node, such as a pointer. The request information contains a start offset, such as a position at which copying is started, and the size of data to be copied. The performance result information contains a start offset and the size of copied data. FIG. 6 illustrates an example of a structure. In FIG. 6, a structure stored in the server data storage unit 103 is illustrated. A code 6001 illustrated in FIG. 6 may be an example of an element 5001 illustrated in FIG. 5. A code 6002 illustrated in FIG. 6 may be an example of an element 5002 illustrated in FIG. 5. A code 6003 illustrated in FIG. 6 may be an example of an element 5003 illustrated in FIG. 5. A code 6004 illustrated in FIG. 6 may be an example of an element 5004 illustrated in FIG. 5.

Figure 7:
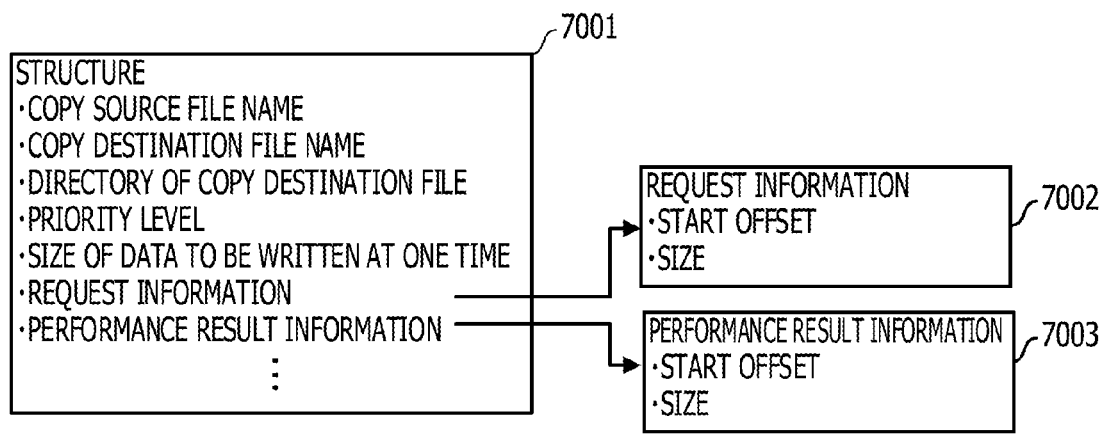
FIG. 7 illustrates an example of a data structure.

FIG. 7 illustrates an example of a data structure. In FIG. 7, the structure of data stored in the node data storage unit 312 illustrated in FIG. 4 is illustrated. Data is stored in the node data storage unit 312 as a structure. The structure may be generated for each copying request received from the front-end server 1, and contains a copy source file name, a copy destination file name, information representing a file directory of a copy destination file, a priority level, the size of data to be written at one time, data indicating request information, such as a pointer, and data indicating performance result information, such as a pointer. The request information contains a start offset and the size of data to be copied. The performance result information contains a start offset and the size of copied data. FIG. 8 illustrates an example of a structure. In FIG. 8, an example of a portion corresponding to an element 7001 illustrated in FIG. 7 in a structure stored in the node data storage unit 312 is illustrated. An element 7002 illustrated in FIG. 7 may be similar to the element 5003 illustrated in FIG. 5. An element 7003 illustrated in FIG. 7 may be similar to the element 5004 illustrated in FIG. 5. As "char srcpath" and "char dstpath", values usable by each IO node in the distributed file system may be set.

FIG. 9 illustrates an example of a structure. In FIG. 9, a structure about data exchanged between the front-end server 1 and the IO nodes 31 to 34 is illustrated. The data exchanged between the front-end server 1 and the IO nodes 31 to 34 is generated as a structure. In the structure, "int64_t ndata" denotes a setting value about copying of data, and "int64_t priority" denotes a priority level.

Figure 10:
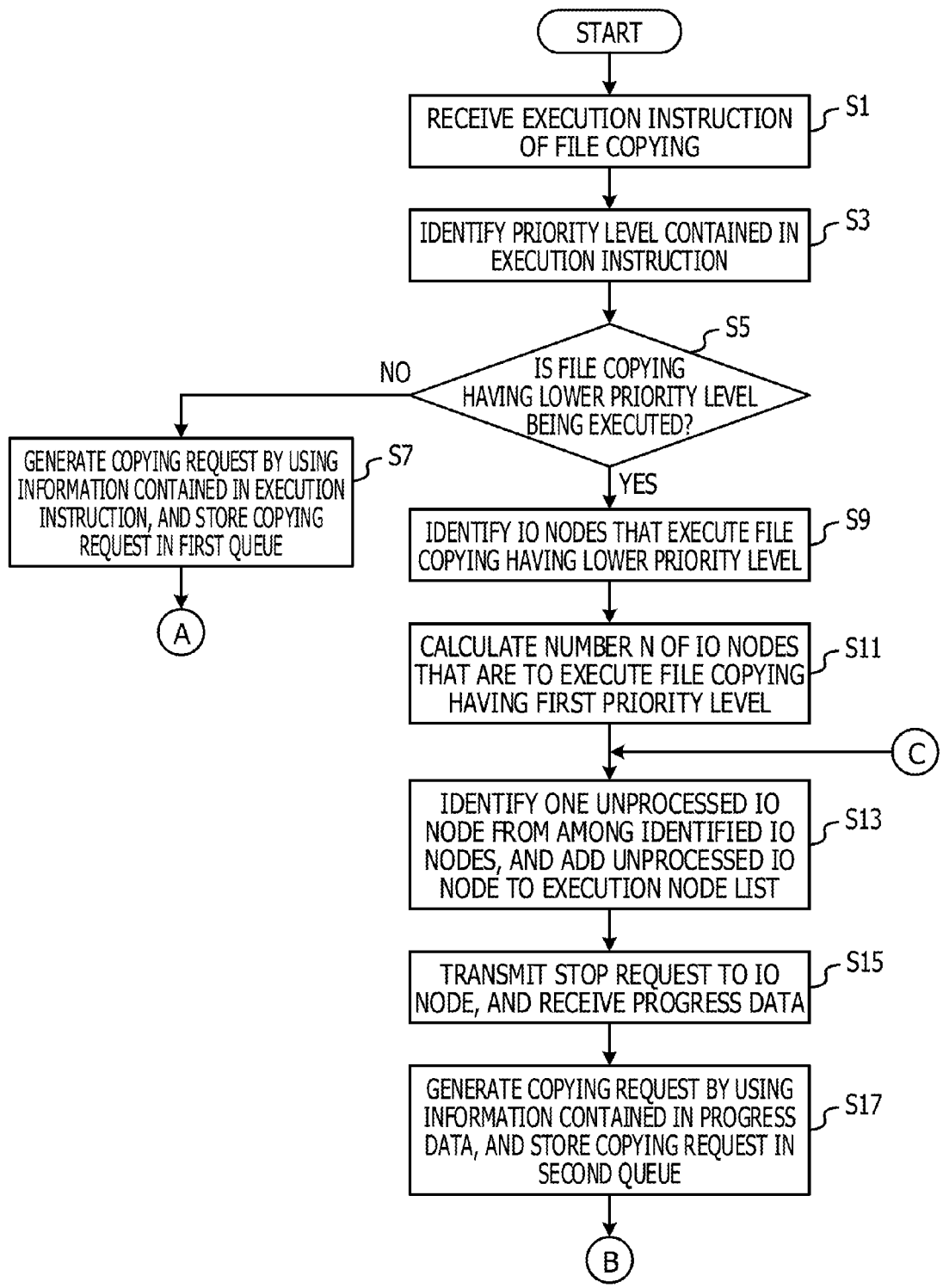
FIG. 10 illustrates an example of a process executed by a front-end server.
Figure 11:
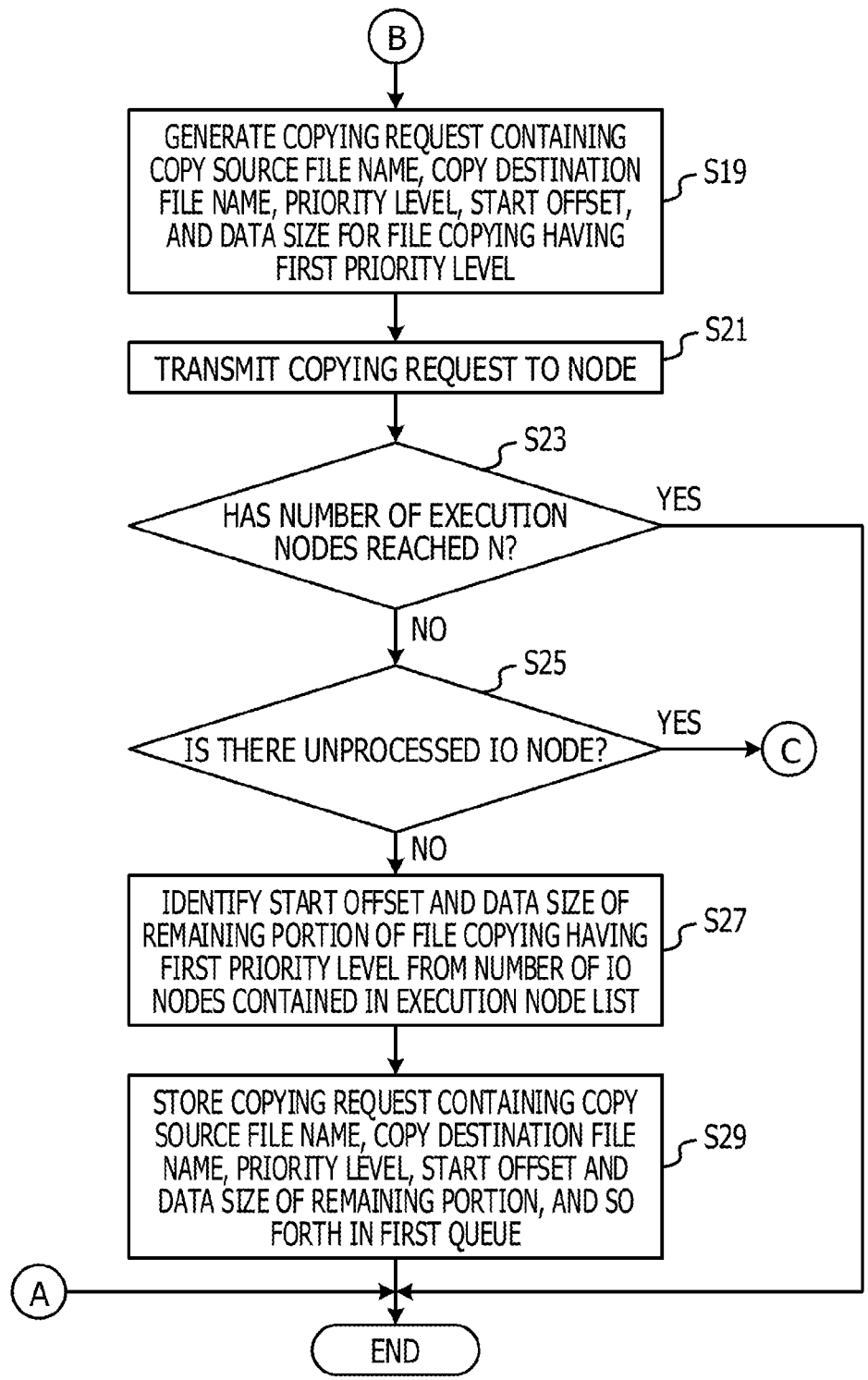
FIG. 11 illustrates an example of a process executed by a front-end server.
Figure 12:
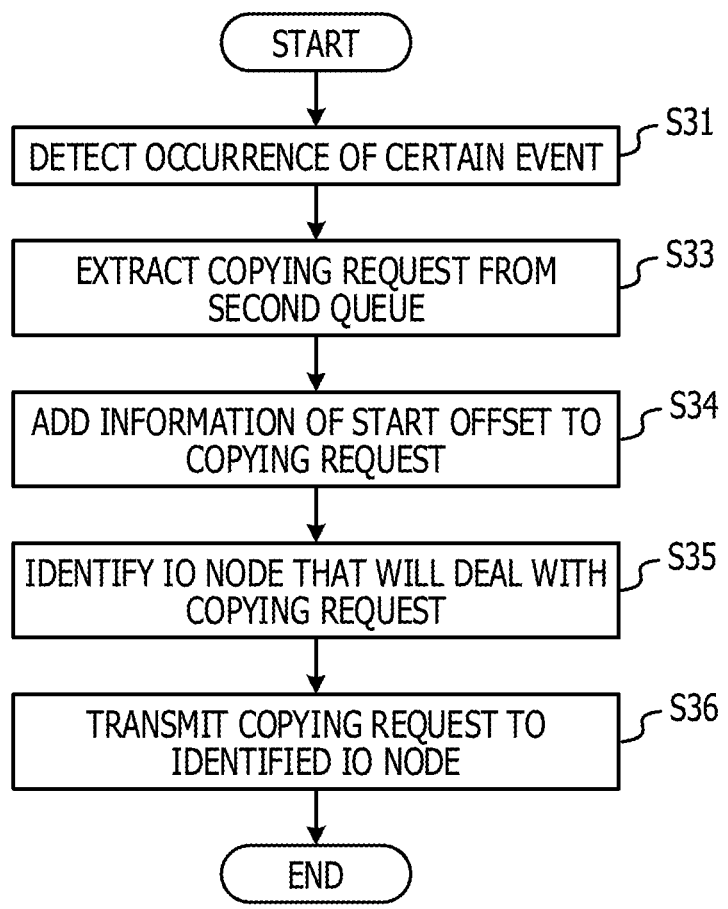
FIG. 12 illustrates an example of a process executed by a front-end server.

FIGS. 10 to 12 each illustrate an example of a process executed by a front-end server. In the distributed file system, file copying having a first priority level and file copying having a second priority level, which is a lower priority level than the first priority level, may be executed.

When the user terminal 9 transmits an execution instruction, the front-end server 1 executes a process. The reception unit 101 of the front-end server 1 receives an execution instruction of file copying from the user terminal 9 (FIG. 10: operation S1), and outputs it to the management unit 102. The execution instruction of file copying may contain, for example, a copy source file name, a copy destination file name, a priority level, and a file size.

The management unit 102 identifies a priority level contained in the execution instruction received from the reception unit 101 (operation S3). The management unit 102 determines, by using data stored in the server data storage unit 103, whether or not file copying having a lower priority level than the priority level identified in operation S3 is being executed (operation S5). For example, as for file copying being executed, structures are stored in the server data storage unit 103, and thus, the management unit 102 compares a priority level in each structure with the priority level identified in operation S3.

In the case where file copying having a lower priority level than the priority level identified in operation S3 is not being executed (operation S5: No route), the case is a state in which the priority level identified in operation S3 is the second priority level, or a state in which the priority level identified in operation S3 is the first priority level and file copying having the second priority level is not being executed. Hence, the management unit 102 generates a copying request based on information contained in the execution instruction, for example, a copy source file name, a copy destination file name, a priority level, and a file size, and stores it in the first queue 105 (operation S7). The process proceeds to a process illustrated in FIG. 11 via a terminal A. The process ends.

In the case where a certain state is entered, for example, in the case where an IO node which is not executing file copying occurs, or in the case where a certain time arrives, the copying request stored in the first queue 105 is extracted by the transmission unit 104, and transmitted to the IO node. In the case where there are a plurality of IO nodes which are not executing file copying, the transmission unit 104 may transmit a copying request to each of the plurality of IO nodes. In this case, the transmission unit 104 adds information of the size of data to be copied by each IO node and a start offset to the copying request to be transmitted to each IO node.

In the case where file copying having a lower priority level than the priority level identified in operation S3 is being executed (operation S5: Yes route), the priority level identified in operation S3 is the first priority level. The management unit 102 identifies, from the server data storage unit 103, IO nodes that execute file copying having a lower priority level than the first priority level, for example, the second priority level (operation S9).

The management unit 102 calculates, based on the information contained in the execution instruction, the number N (N is a natural number) of IO nodes that are to execute file copying having the first priority level (operation S11). For example, in the case where information of a time when file copying is completed is contained in the execution instruction, a transfer rate may be obtained by dividing the file size by a time period from the point of processing in operation S11 to the time when file copying is completed. The number N of IO nodes that are to execute the file copying having the first priority level may be calculated by dividing the obtained transfer rate by a transfer rate of one IO node. In the case where information of the number of IO nodes that are to execute the file copying having the first priority level is contained in the execution instruction, the information may be used. In the case where the information of the time when file copying is completed is not contained in the execution instruction, N=1 may be set.

The management unit 102 identifies one unprocessed IO node from among the IO nodes identified in operation S9, and adds it to an execution node list (operation S13). The execution node list may be, for example, IO node information stored in the server data storage unit 103.

In the case where operation S13 is executed with respect to the execution instruction received in operation S1 for the first time, the management unit 102 generates a structure for the execution instruction received in operation S1, and generates IO node information. In the case where this is not the first time to execute operation S13, IO node information is added to the already generated structure.

In operation S13, an IO node having the highest effective transfer rate among unprocessed IO nodes may be identified based on positional relationships among a copy source file, a copy destination file, and the IO nodes. For example, information of effective transfer rates may be acquired by using measurements made in advance or the like.

The management unit 102 transmits a stop request to stop file copying being executed to the IO node identified in operation S13. The management unit 102 receives progress data representing the progress of the stopped file copying as a response to the stop request (operation S15).

The management unit 102 generates a copying request based on information contained in the progress data received in operation S15, and stores it in the second queue 106 (operation S17). The process proceeds to operation S19 in FIG. 11 via a terminal B illustrated in FIG. 10. The progress data may contain, for example, a copy source file name, a copy destination file name, a priority level, a position at which copying has been stopped, a remaining data size, and so forth.

In FIG. 11, the management unit 102 generates a copying request containing the copy source file name, the copy destination file name, the priority level, a start offset, and a data size for the file copying having the first priority level based on the information contained in the execution instruction (FIG. 11: operation S19). The data size is obtained by dividing the file size by the number N of IO nodes that are to execute file copying. The start offset is obtained from the obtained data size and the number of IO nodes added to the execution node list.

The management unit 102 outputs the copying request generated in operation S19 to the transmission unit 104. In response to this, the transmission unit 104 transmits the copying request generated in operation S19 to the IO node identified in operation S13 (operation S21).

The management unit 102 determines whether or not the number of execution nodes has reached N (operation S23). When the number of execution nodes has reached N (operation S23: Yes route), the process ends because assignment of IO nodes to the file copying having the first priority level has been completed.

When the number of execution nodes has not reached N (operation S23: No route), the management unit 102 determines whether or not there is an unprocessed IO node (operation S25). When there is an unprocessed IO node (operation S25: Yes route), the process returns to the process of operation S13 via a terminal C illustrated in FIG. 11 to deal with a next IO node.

When there is no unprocessed IO node (operation S25: No route), the number of IO nodes that are to execute the file copying having the first priority level may be insufficient. Because of this, the management unit 102 identifies a start offset and a data size of a remaining portion of the file copying having the first priority level based on the data stored in the server data storage unit 103 (operation S27). For example, when a value obtained by multiplying the number of IO nodes assigned to the file copying having the first priority level by the size of data to be copied by one IO node is subtracted from the size of the file to be transferred by the file copying having the first priority level, the data size of the remaining portion is obtained. The start offset is obtained from the size of the file to be transferred by the file copying having the first priority level and the data size of the remaining portion.

The management unit 102 generates a copying request containing the copy source file name, the copy destination file name, the priority level, the start offset and the data size of the remaining portion, and so forth, and stores it in the first queue 105 (operation S29). Then, the process ends.

Through execution of the above processes, the file copying having the first priority level may be preferentially executed. File copying having the second priority level whose execution has been interrupted is resumed in another IO node, and thus completion of the file copying having the first priority level may not be waited.

In FIG. 12, the front-end server 1 transmits the copying request stored in the second queue 106 to an IO node.

The management unit 102 detects the occurrence of an event (FIG. 12: operation S31). The event may be, for example, an event in which the file copying having the first priority level is started, and is detected by using a notification from an IO node that has started the file copying having the first priority level. The notification from the IO node contains, for example, the copy source file name, the copy destination file name, the priority level, and so forth.

The management unit 102 notifies the transmission unit 104 of the start of the file copying having the first priority level. In response to this, the transmission unit 104 extracts a copying request for file copying interrupted by the IO node that has started the file copying having the first priority level from the second queue 106 (operation S33). The number of copying requests extracted from the second queue 106 may be two or more.

The transmission unit 104 calculates a start offset from information of a position at which copying has been stopped contained in the extracted copying request, and adds information of the calculated start offset to the copying request (operation S35). The start offset may be a position one byte ahead of the position at which copying has been stopped.

The transmission unit 104 identifies an IO node that deals with the copying request extracted in operation S33 (operation S37). In operation S37, a node other than the IO node identified in operation S13 is identified. An IO node may be identified from among nodes other than the IO node identified in operation S13 based on loads on a network and processing loads of IO nodes that are estimated from positional relationships among a copy source file, a copy destination file, and the IO nodes. In this case, information on the loads on a network and the processing loads of IO nodes may be acquired by using measurements made in advance or the like. In operation S37, the same number of IO nodes as the number of extracted copying requests may be identified.

The transmission unit 104 updates the data stored in the server data storage unit 103 based on a processing result in operation S37. The transmission unit 104 transmits the copying request to the IO node identified in operation S37 (operation S39). In operation S39, one copying request is transmitted to one IO node. The process ends.

In the above process, interrupted file copying is resumed by an IO node different from an IO node that has executed the file copying, and thus the file copying may not have to be started again from the beginning.

Figure 13:
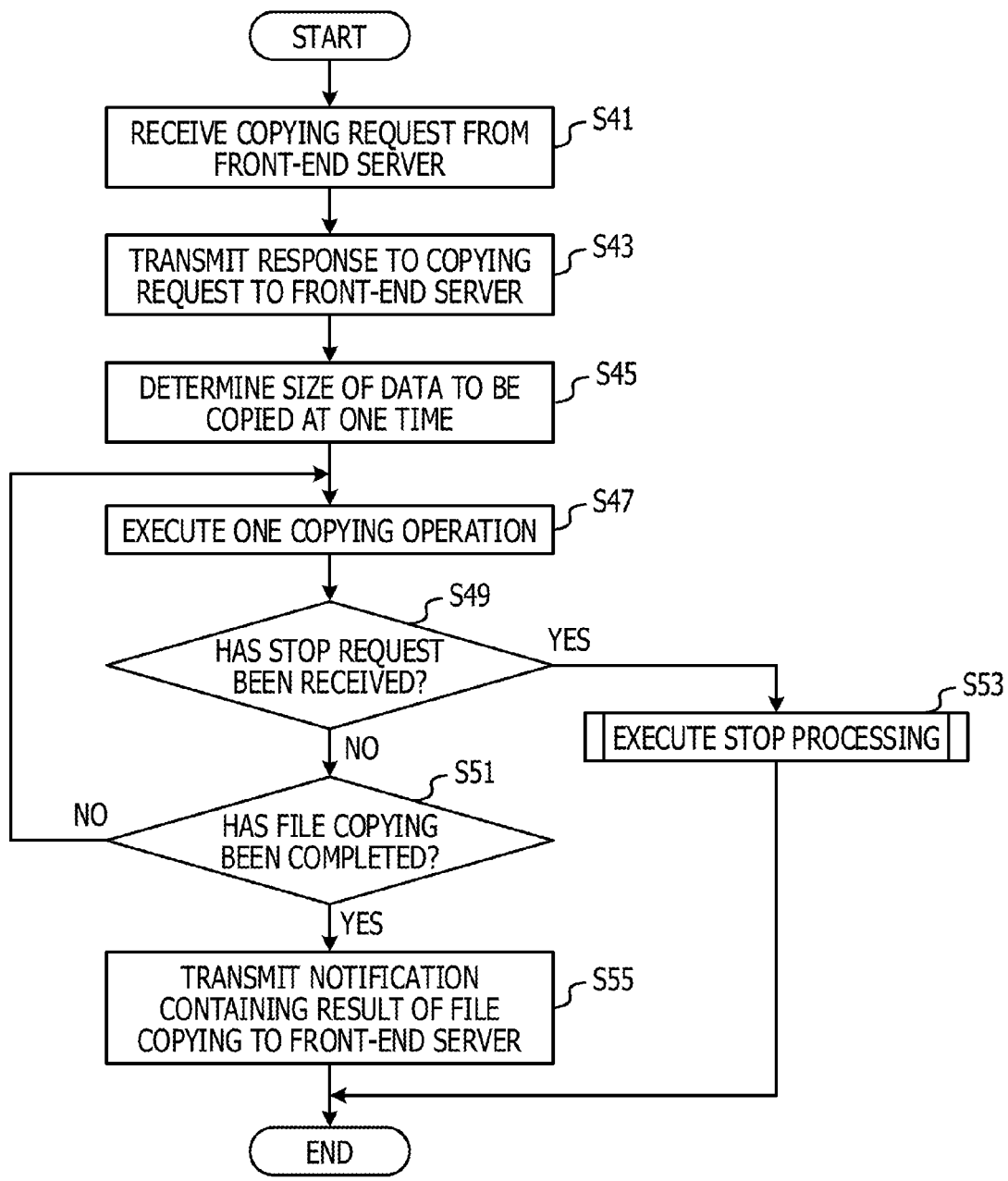
FIG. 13 illustrates an example of a process executed by an IO node.
Figure 14:
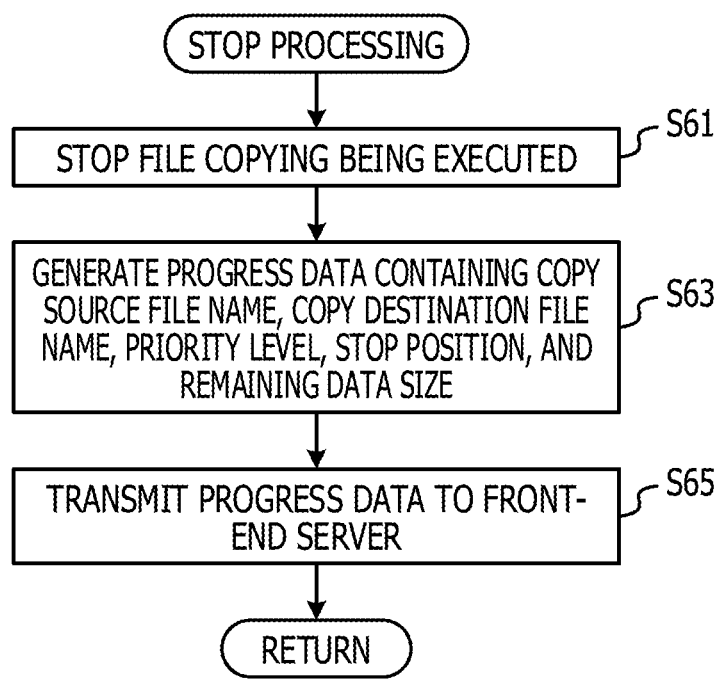
FIG. 14 illustrates an example of a process executed by an IO node.

FIGS. 13 and 14 each illustrate an example of a process executed by an IO node.

An IO node, for example, the copying unit 311 of the IO node 31 receives a copying request from the front-end server 1 (FIG. 13: operation S41). In response to this, the copying unit 311 transmits a response to the copying request to the front-end server 1 (operation S43).

The copying unit 311 determines the size of data to be copied at one time based on a priority level contained in the copying request (operation S45). For example, as the priority level decreases, the size of data to be copied at one time may be reduced. Such processing may reduce a delay of a timing when file copying having the second priority level is stopped in the case where a copying request for file copying having the first priority level is made during the file copying having the second priority level.

The copying unit 311 executes one copying operation based on information contained in the copying request received in operation S41 (operation S47). The copying unit 311 stores performance result information of the copying in the node data storage unit 312.

The copying unit 311 determines whether or not it has received a stop request from the front-end server 1 (operation S49). When a stop request has been received (operation S49: Yes route), the copying unit 311 executes stop processing (operation S53). The process ends.

The copying unit 311 stops file copying being executed (FIG. 14: operation S61).

The copying unit 311 generates, for the file copying whose execution has been stopped, progress data containing a copy source file name, a copy destination file name, a priority level, a position at which the copying has been stopped, and a remaining data size (operation S63). The copying unit 311 transmits the progress data generated in operation S63 to the front-end server 1 (operation S65). The process returns to the calling process.

In the above process, execution of the stopped file copying may be taken over by another IO node.

As illustrated in FIG. 13, in operation S49, when it is determined that no stop request has been received (operation S49: No route), the copying unit 311 determines whether or not file copying specified in the copying request has been completed (operation S51). When the file copying specified in the copying request has not been completed (operation S51: No route), the process returns to the process of operation S47.

When the file copying specified in the copying request has been completed (operation S51: Yes route), the copying unit 311 reads performance result information of the completed file copying from the node data storage unit 312, and transmits a notification containing the read performance result information to the front-end server 1 (operation S55). The process ends. The management unit 102 of the front-end server 1 updates the data stored in the server data storage unit 103 based on the performance result information contained in the received notification.

In the above process, file copying having a relatively low priority level may be interrupted, and file copying having a relatively high priority level may be executed.

For example, the functional block configurations of the front-end server 1, the IO node 31, the first file management apparatus 5, and the second file management apparatus 7 may not coincide with program module configurations.

The above-mentioned data retention configurations may be an example. As long as a processing result is not changed, the order of processes may be changed, and processes may be executed in parallel.

The above-mentioned processes may also be applied to file transfer other than file copying, for example, file migration.

The front-end server 1 may receive an execution instruction from the user terminal 9, and may also receive an input of an execution instruction from a user who operates the front-end server 1.

The front-end server 1 may calculate a start offset in a copying request stored in the second queue 106, and an IO node that has stopped file copying may also calculate a start offset based on information of a position at which the file copying has been stopped.

An IO node which is not executing processing when an execution instruction for file copying having the first priority level is received may execute the file copying having the first priority level.

In operation S29, the copying request may be stored as a first entry in the first queue 105. Thus, copying for the remaining portion may also be started as soon as possible.

Figure 15:
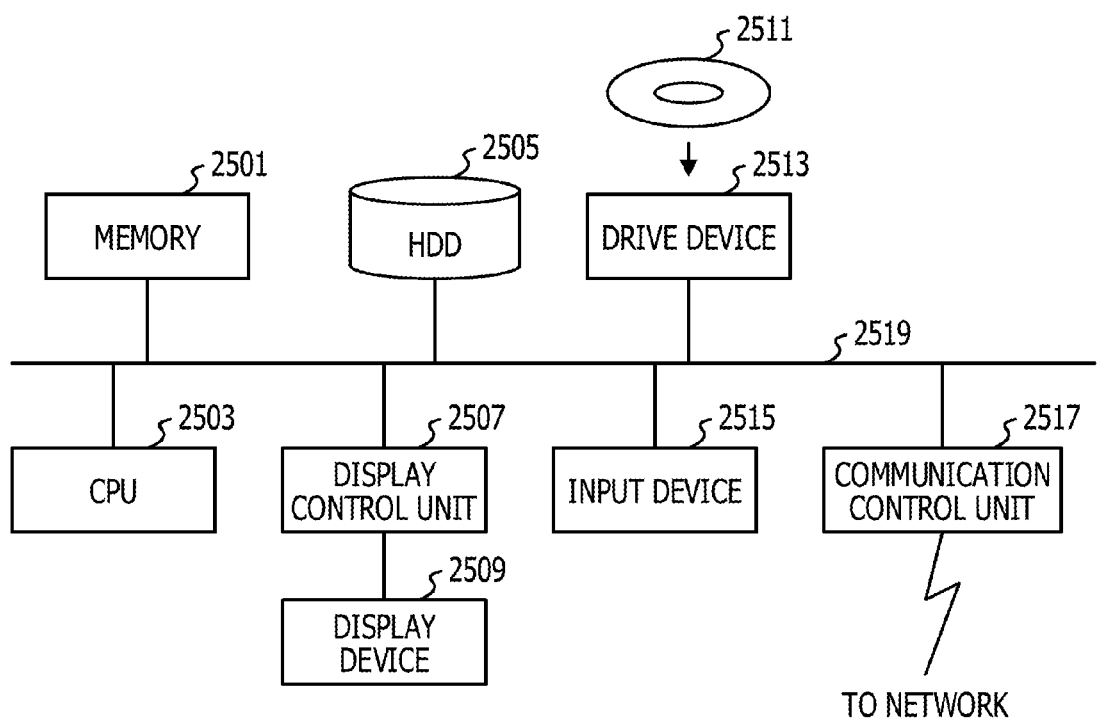
FIG. 15 illustrates an example of a functional block of a computer.

FIG. 15 illustrates an example of a functional block of a computer. The front-end server 1, the IO nodes 31 to 34, the first file management apparatus 5, the second file management apparatus 7, and the user terminal 9 may be a computer apparatus. For example, as illustrated in FIG. 15, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 used for connection to a network are coupled to one another with a bus 2519. An operating system (OS) and an application program for implementing the above-mentioned processes are stored in the HDD 2505, and read from the HDD 2505 into the memory 2501 when executed by the CPU 2503. The CPU 2503 controls the display control unit 2507, the communication control unit 2517, and the drive device 2513 in accordance with processes in the application program so as to cause them to execute certain operations. Data being processed may be stored in the memory 2501, and may also be stored in the HDD 2505. The application program for implementing the above-mentioned processes may be stored in the removable disk 2511 that is readable by a computer, distributed, and installed from the drive device 2513 on the HDD 2505. The application program may be installed on the HDD 2505 via a network, such as the Internet, and the communication control unit 2517. In the computer apparatus, the above-mentioned various functions may be executed by causing hardware, such as the CPU 2503 and the memory 2501, and programs, such as the OS and the application program, to work together organically.

For example, an information processing system includes a plurality of nodes that execute data transfer and a management apparatus that manages the plurality of nodes. The management apparatus may include a data storage unit that stores a priority level of data transfer and an identifier of a node that executes the data transfer which are associated with an identifier of the data transfer. The management apparatus may include an identification unit that, when receiving an execution instruction containing information of data transfer to be executed, identifies one or a plurality of first nodes that execute data transfer having a lower priority level than a priority level contained in the information of the data transfer to be executed from the data storage unit. The management apparatus may include a transmission unit that, to each of the one or the plurality of first nodes identified by the identification unit, transmits a stop request to stop the data transfer executed by the first node, and also transmits a transfer request containing the information of the data transfer to be executed and information of a portion to be executed by the first node of the data transfer to be executed.

In the information processing system in which the plurality of nodes execute data transfer, data transfer may be flexibly executed in accordance with priority levels.

The management apparatus may further include a reception unit that receives, from each of the one or the plurality of first nodes, a response containing a transfer source data name, a transfer destination data name, information indicating a position at which the first node has stopped transfer, and information of a remaining data size, and stores the response in a second data storage unit. The data transfer stopped by the first node may be executed by another node.

The identification unit may identify a second node that satisfies a certain condition among nodes other than the one or the plurality of first nodes from the data storage unit. The transmission unit may extract one or a plurality of responses stored in the second data storage unit, and transmit the one or the plurality of responses to the second node identified by the identification unit. The stopped data transfer may be resumed, and thus the number of data re-transfer operations may be reduced.

The identification unit may calculate the number N of nodes to be assigned to the data transfer to be executed based on information of the size of data to be transferred by the data transfer to be executed and information of a time when the data transfer to be executed is completed that are contained in the information of the data transfer to be executed. The identification unit may identify identifiers of an N number of first nodes from among identifiers of the one or the plurality of first nodes identified. The data transfer to be executed may be completed by a specified time.

Each of the plurality of nodes may execute a process of checking whether or not the node has received a stop request from the management apparatus every time the node transfers a certain amount of data. A delay in detection of reception of a stop request may be reduced, and a delay in starting the data transfer to be executed may be reduced.

The certain condition may include at least one of a condition on a position of a node in a network and a condition on a processing load of the node. Influence on data transfer being executed may be reduced.

A control method of an information processing system is executed in an information processing system including a plurality of nodes that execute data transfer and a management apparatus that manages the plurality of nodes. In the control method of the information processing system, when an execution instruction containing information of data transfer to be executed is received, one or a plurality of first nodes that execute data transfer having a lower priority level than a priority level contained in the information of the data transfer to be executed may be identified from a data storage unit that stores a priority level of data transfer and an identifier of a node that executes the data transfer which are associated with an identifier of the data transfer. To each of the one or the plurality of first nodes identified, a stop request to stop the data transfer executed by the first node may be transmitted. A transfer request containing the information of the data transfer to be executed and information of a portion to be executed by the first node of the data transfer to be executed may be transmitted.

A program for causing a computer to execute the above-mentioned processes may be created. The program may be stored in computer-readable storage media or storage devices, such as a flexible disk, a compact disc read only memory (CD-ROM), a magnetic optical disk, a semiconductor memory, and a hard disk. An intermediate processing result may be temporarily stored in a storage device, such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
a management apparatus, coupled to a plurality of nodes configured to execute data transfer, configured to manage the plurality of nodes, wherein the management apparatus performs operations to:
acquire data transfer information in which a priority level of data transfer and an identifier of a node that executes the data transfer are associated with an identifier of the data transfer;
identify, when receiving an execution instruction of first data transfer, one or more first nodes that execute second data transfer having a lower priority level than a priority level included in information of the first data transfer based on the data transfer information; and
transmit, to each of the one or more first nodes, a stop request to stop the second data transfer, and a transfer request including the information of the first data transfer and information of a portion to be executed by the first node of the first data transfer to be executed by the first node,
wherein the management apparatus calculates a number N to be assigned to the first data transfer from among the one or more first nodes based on size information of data to be transferred by the first data transfer and information of a time when the first data transfer is completed that is included in the information of the first data transfer.

2. The information processing system according to claim 1, wherein the management apparatus receives, from each of the one or more first nodes, a response including transfer source information, transfer destination information, information of a position of stopping the second data transfer, and size information of data that is not transferred.

3. The information processing system according to claim 2, wherein the management apparatus identifies a second node that is a node other than the one or more first nodes and satisfies a condition.

4. The information processing system according to claim 3, wherein the management apparatus transmits the response of each of the one or more first nodes to the second node.

5. The information processing system according to claim 3, wherein the condition includes at least one of a condition on a position of a node in a network that includes the plurality of nodes and the management apparatus and a condition on a processing load of the node.

6. The information processing system according to claim 1, wherein the management apparatus identifies identifiers N nodes from the data transfer information.

7. The information processing system according to claim 1, wherein each of the plurality of nodes checks a reception of the stop request at a time of data transfer.

8. An information management apparatus comprising:
a processor configured to execute a program; and
a memory configured to store the program,
wherein, based on the program, the processor performs operations to:
  acquire data transfer information in which a priority level of data transfer and an identifier of a node that executes the data transfer are associated with an identifier of the data transfer;
  identify, when receiving an execution instruction of first data transfer, identifies one or more first nodes that execute second data transfer having a lower priority level than a priority level included in information of the first data transfer based on the data transfer information; and
  transmit, to each of the one or more first nodes, a stop request to stop the second data transfer, and a transfer request including the information of the first data transfer and information of a portion of the first data transfer to be executed by the first node,
wherein the processor calculates a number N to be assigned to the first data transfer from among the one or more first nodes based on size information of data to be transferred by the first data transfer and information of a time when the first data transfer is completed that is included in the information of the first data transfer.

9. The information management apparatus according to claim 8, wherein the processor receives, from each of the one or more first nodes, a response including transfer source information, transfer destination information, information of a position of stopping the second data transfer, and size information of data that is not transferred.

10. The information management apparatus according to claim 9, wherein the processor identifies a second node that is a node other than the one or more first nodes and satisfies a condition.

11. The information management apparatus according to claim 10, wherein the processor transmits the response of each of the one or more first nodes to the second node.

12. The information management apparatus according to claim 10, wherein the condition includes at least one of a condition on a position of a node in a network that includes a plurality of nodes and the management apparatus and a condition on a processing load of the node.

13. The information management apparatus according to claim 8, wherein the processor identifies identifiers N nodes from the data transfer information.

14. A data transfer control method comprising:
acquiring data transfer information in which a priority level of data transfer and an identifier of a node that executes the data transfer are associated with an identifier of the data transfer;
identifying, with a processor, in response to reception of an execution instruction of first data transfer, one or more first nodes that execute second data transfer having a lower priority level than a priority level included in information of the first data transfer from among a plurality of nodes included in a network based on the data transfer information;
transmitting, to each of the one or more first nodes, a stop request to stop the second data transfer, and a transfer request including the information of the first data transfer and information of a portion of the first data transfer to be executed by the first node; and
calculating a number N to be assigned to the first data transfer from among the one or more first nodes based on size information of data to be transferred by the first data transfer and information of a time when the first data transfer is completed that is included in the information of the first data transfer.

15. The data transfer control method according to claim 14, further comprising:
receiving, from each of the one or more first nodes, a response including transfer source information, transfer destination information, information of a position of stopping the second data transfer, and size information of data that is not transferred.

16. The data transfer control method according to claim 15, further comprising:
identifying a second node that is a node other than the one or more first nodes and satisfies a condition.

17. The information management apparatus according to claim 16, further comprising:
transmitting the response of each of the one or more first nodes to the second node.

* * * * *